US012488249B2

United States Patent
Lou et al.

(10) Patent No.: US 12,488,249 B2
(45) Date of Patent: Dec. 2, 2025

(54) SECURE, ACCURATE AND FAST NEURAL NETWORK INFERENCE BY REPLACING AT LEAST ONE NON-LINEAR ACTIVATION CHANNEL

(71) Applicant: SAMSUNG ELECTRONICS CO., LTD., Suwon-si (KR)

(72) Inventors: Qian Lou, Mountain View, CA (US); Yilin Shen, Mountain View, CA (US); Hongxia Jin, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1064 days.

(21) Appl. No.: 17/465,439

(22) Filed: Sep. 2, 2021

(65) Prior Publication Data

US 2022/0121947 A1 Apr. 21, 2022

Related U.S. Application Data

(60) Provisional application No. 63/093,949, filed on Oct. 20, 2020.

(51) Int. Cl.
*G06N 3/082* (2023.01)
*H04L 67/00* (2022.01)

(52) U.S. Cl.
CPC .......... *G06N 3/082* (2013.01); *H04L 67/34* (2013.01)

(58) Field of Classification Search
CPC ........ G06N 3/082; G06N 3/084; G06N 3/086; G06N 3/088; G06F 17/17; H04L 67/34
See application file for complete search history.

(56) References Cited

U.S. PATENT DOCUMENTS

| | | | | |
|---|---|---|---|---|
| 10,891,537 | B2 * | 1/2021 | Wang | G06N 3/04 |
| 11,853,401 | B1 * | 12/2023 | Nookula | G06F 18/2163 |
| 2015/0254555 | A1 * | 9/2015 | Williams, Jr. | G06N 3/045 706/14 |
| 2016/0350648 | A1 | 12/2016 | Gilad-Bachrach et al. | |
| 2017/0228639 | A1 * | 8/2017 | Hara | G06N 7/01 |
| 2017/0372201 | A1 * | 12/2017 | Gupta | G06N 20/00 |
| 2018/0060278 | A1 * | 3/2018 | Lin | G06N 3/048 |
| 2019/0272309 | A1 * | 9/2019 | Chung | G06N 3/048 |
| 2020/0036510 | A1 * | 1/2020 | Gomez | H04L 9/008 |
| 2021/0027166 | A1 | 1/2021 | Gorokhov et al. | |
| 2021/0042559 | A1 * | 2/2021 | Xu | G06F 18/253 |

(Continued)

FOREIGN PATENT DOCUMENTS

KR 10-2019-0110068 A 9/2019

OTHER PUBLICATIONS

"Chen et al., Deep Neural Network Acceleration Based on Low-Rank Approximated Channel Pruning, 2020, IEEE" (Year: 2020).*

(Continued)

*Primary Examiner* — Randall K. Baldwin
(74) *Attorney, Agent, or Firm* — Sughrue Mion, PLLC

(57) ABSTRACT

A method of a server device is provided. The method of a server device includes retrieving a prediction input and a prediction setting, replacing at least one non-linear activation channel in a neural network with at least one replacement channel based on the received prediction setting, generating a prediction based on the received prediction input based on the neural network with the at least one replacement channel, and outputting the generated prediction.

20 Claims, 11 Drawing Sheets

(56) References Cited

U.S. PATENT DOCUMENTS

| | | | |
|---|---|---|---|
| 2021/0042624 A1 | 2/2021 | Matveev et al. | |
| 2021/0056352 A1 | 2/2021 | Boustati et al. | |
| 2021/0081789 A1 | 3/2021 | Chai et al. | |
| 2021/0081806 A1 | 3/2021 | Chai et al. | |
| 2021/0089922 A1 | 3/2021 | Lu et al. | |
| 2021/0209247 A1* | 7/2021 | Mohassel | A63B 21/023 |
| 2021/0397988 A1* | 12/2021 | Sarpatwar | G06N 3/04 |
| 2023/0118109 A1* | 4/2023 | Mohassel | G06N 3/045 |
| | | | 706/25 |

OTHER PUBLICATIONS

"Nikolaev et al., Learning polynomial feedforward neural networks by genetic programming and backpropagation, IEEE, 3003" (Year: 2003).* https://arxiv.org/pdf/1711.08797 Practical Hash Functions for Similarity Estimation and Dimensionality Reduction* Søren Dahlgaard1,2, Mathias Bæk Tejs Knudsen1,2, and Mikkel Thorup (Year: 2017).* https://arxiv.org/pdf/1704.02685 Learning Important Features Through Propagating Activation Differences Avanti Shrikumar 1 Peyton Greenside 1 Anshul Kundaje 1 (Year: 2019).*

Sze, Vivienne, et al. "Efficient processing of deep neural networks: A tutorial and survey." Proceedings of the IEEE 105.12 (2017): 2295-2329. (Year: 2017).*

Lou, Qian, and Lei Jiang. "She: A fast and accurate privacy-preserving deep neural network via leveled tfhe and logarithmic data representation." arXiv preprint arXiv:1906.00148 (2019). (Year: 2019).*

AboulAtta, Moustafa, Matthias Ossadnik, and Seyed-Ahmad Ahmadi. "Stabilizing inputs to approximated nonlinear functions for inference with homomorphic encryption in deep neural networks." arXiv preprint arXiv:1902.01870 (2019). (Year: 2019).*

Riazi, M. Sadegh, Bita Darvish Rouani, and Farinaz Koushanfar. "Deep learning on private data." IEEE Security & Privacy 17.6 (2019): 54-63. (Year: 2019).*

Wright, Sarah, and Tshilidzi Marwala. "Artificial intelligence techniques for steam generator modelling." arXiv preprint arXiv:0811.1711 (2008). (Year: 2008).*

International Search Report dated Jan. 11, 2022 issued by the International Searching Authority in counterpart International Application No. PCT/KR2021/014460 (PCT/ISA/210).

* cited by examiner

PBT:

| Layer#: | 0 | 1 | 2 | 3 |
|---|---|---|---|---|
| α: | α[0] | α[1] | α[2] | α[3] |

$PBT(\alpha[0:3] = random\_init, D, W) \rightarrow \alpha[0:3], S, A, W$   // Directly search α[0:3]

FIG.6

BTPBT:

| Layer#: | 0 | 1 | 2 | 3 |
|---|---|---|---|---|
| α: | $\alpha_0$ | $\alpha_0$ | $\alpha_0$ | $\alpha_0$ |
|  | $\alpha_1$ | $\alpha_2$ |  |  |
|  | $\alpha_3$ | $\alpha_4$ |  |  |
|  | $\alpha_5$ | $\alpha_6$ |  |  |

$PBT(\alpha_0, D, W) \rightarrow (\alpha[0:3] = \alpha_0, S_0, A_0, W_0) \rightarrow$ Candidate[0]
$PBT(\alpha_1 = \alpha_0, \alpha_2 = \alpha_0, D, W) \rightarrow (\alpha[0:3] = \{\alpha_1, \alpha_1, \alpha_2, \alpha_2\}, S_1, A_1, W_1) \rightarrow$ Candidate[1]
$PBT(\alpha_3 = \alpha_1, \alpha_4 = \alpha_1, D, W) \rightarrow (\alpha[0:3] = \{\alpha_3, \alpha_4, \alpha_2, \alpha_2\}, S_2, A_2, W_2) \rightarrow$ Candidate[2]
$PBT(\alpha_5 = \alpha_2, \alpha_6 = \alpha_2, D, W) \rightarrow (\alpha[0:3] = \{\alpha_3, \alpha_4, \alpha_5, \alpha_6\}, S_3, A_3, W_3) \rightarrow$ Candidate[3]

Pickup the best candidate BC with the largest score value S, e.g.  $BC = [\alpha_3, \alpha_4, \alpha_5, \alpha_6]$

| α: | α[0] | α[1] | α[2] | α[3] |

$PBT(\alpha[0:3] = BC, D, W)$   // Search α[0:3] with best candidate BC

FIG.7

SECURE, ACCURATE AND FAST NEURAL NETWORK INFERENCE BY REPLACING AT LEAST ONE NON-LINEAR ACTIVATION CHANNEL

CROSS-REFERENCE TO RELATED APPLICATION(S)

This application is based on and claims priority under 35 U.S.C. § 119 to U.S. Provisional Patent Application No. 63/093,949 filed on Oct. 20, 2020, the disclosure of which are incorporated herein by reference in its entirety.

BACKGROUND

1. Field

The disclosure relates to a system and method for providing secure neural network inference on encrypted data without decryption. The system and method have improved, customizable performance.

2. Description of Related Art

The advances in neural networks have driven many companies to provide prediction services to users in a wide range of applications. However, current prediction systems raise privacy concerns regarding the user's private data. A cryptographic neural network inference service is an efficient way to allow two parties to execute neural network inference without revealing either party's data or model. Nevertheless, existing cryptographic neural network inference services suffer from enormous running latency. In particular, the latency of communication-expensive cryptographic activation function is many orders of magnitude higher than plaintext-domain activation function, and activations are the necessary components of the modern neural networks. Therefore, slow cryptographic activation has become an obstacle of efficient cryptographic inference. Although some methods have attempted to reduce the cryptographic activation numbers, they still cannot achieve fast and accurate private neural network inference.

SUMMARY

One or more example embodiments provide a system and method for providing secure neural network inference.

In accordance with an aspect of the present disclosure, a method of a server device includes retrieving a prediction input and a prediction setting, replacing at least one non-linear activation channel in a neural network with at least one replacement channel based on the received prediction setting, generating a prediction based on the received prediction input based on the neural network with the at least one replacement channel, and outputting the generated prediction.

In accordance with an aspect of the present disclosure, a method of a client device includes obtaining a prediction input, generating a prediction setting based on a user input to an interface of the client device, inputting the prediction input to a neural network, inputting the prediction setting to modify the neural network, and receiving a prediction generated from the modified neural network. The neural network is modified by replacing at least one non-linear activation channel in the neural network with at least one replacement channel based on the prediction setting.

In accordance with an aspect of the present disclosure, a server device includes a threshold generator, a planner, a neural network, a processor and a memory that stores instructions that, when executed, cause the processor to retrieve a prediction input and a prediction setting, replace, with the planner, at least one non-linear activation channel in the neural network with at least one replacement channel based on the received prediction setting, generate a prediction based on the received prediction input using the neural network with the at least one replacement channel, and output the generated prediction.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 6 is a diagram of a population-based training (PBT) function according to an embodiment;

FIG. 7 is a diagram of a binary tree PBT (BTPBT) function according to an embodiment;

DETAILED DESCRIPTION

The following detailed description of example embodiments refers to the accompanying drawings. The same reference numbers in different drawings may identify the same or similar elements.

Example embodiments of the present disclosure are directed to providing privacy-preserving inference. The system may implement a planner to assign different activations to each channel. These new activations may be non-linear activations, degree-3 polynomial, degree-2 polynomial, and pruning. The system may replace expensive non-linear activations with less expensive linear polynomial approximations. The system may include a planner that determines an activation replacement for each channel. The system may provide a channel-wise activation replacement, since each activation channel has different contributions to the inference accuracy. Thus, the system may only replace unimportant activation channels with polynomials and keep the important activation as original non-linear activation layers. The system also provides a various precision replacement. Each activation may be different degree polynomials or even pruning.

Figure 1:
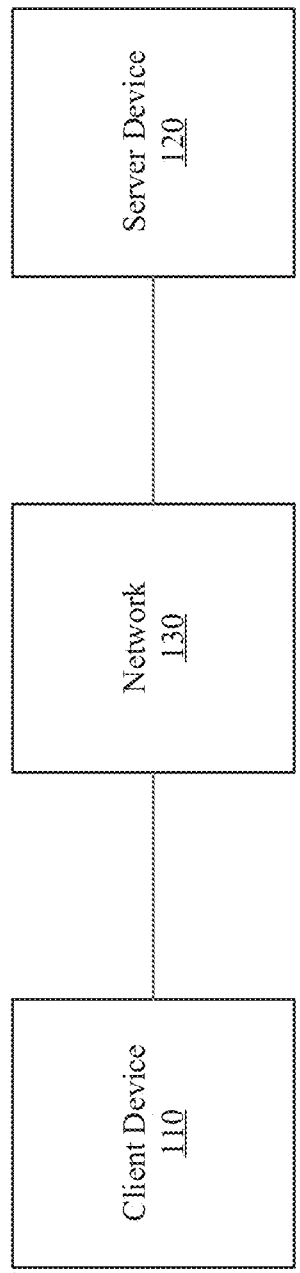
FIG. 1 is a diagram of devices of the system for generating a prediction according to an embodiment.

FIG. 1 is a diagram of devices for performing inference according to an embodiment. FIG. 1 includes a client device 110, a server device 120, and a network 130. The client device 110 and the server device 120 may interconnect via wired connections, wireless connections, or a combination of wired and wireless connections.

The client device 110 includes one or more devices configured to generate an output. For example, the client device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 includes one or more devices configured to retrieve a prediction input and prediction setting and modify a neural network based on the received prediction setting. For example, the server device 120 may be a server device, a computing device, or the like. The server device 120 may receive a prediction input and prediction setting from an external device (e.g., the client device 110 or another external device), replace at least one non-linear activation layer in a neural network with at least one replacement layer based on the prediction setting, generate a prediction based on the received prediction input using the neural network with the at least one replacement layer, and output the generated prediction, for example, to the client device 110.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
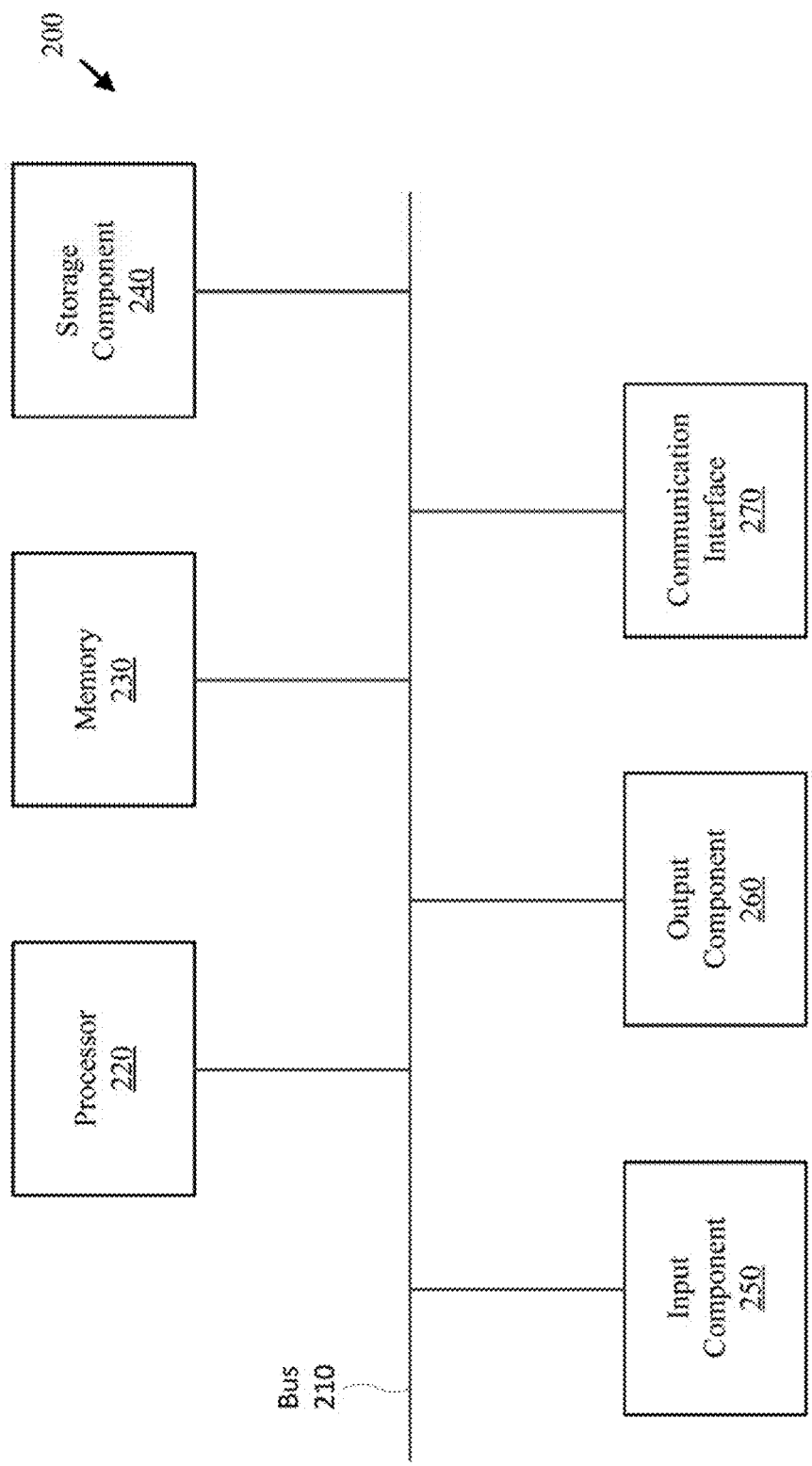
FIG. 2 is a diagram of components of the devices of FIG. 1 according to an embodiment.

FIG. 2 is a diagram of components of one or more devices of FIG. 1 according to an embodiment. Device 200 may correspond to the client device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

In particular, the input component 250 may include two or more cameras, including the first camera and the second camera. The first camera and the second camera may be rear-facing cameras that have different spectral sensitivities and have different fields of view from each other.

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Privacy-preserving inference using an all-rectified linear unit (ReLU) activations (or other non-linear activations) neural network suffers from prohibitive latency due to the garbled circuits (GC)-based ReLU. The planner disclosed herein reduces ReLU numbers to reduce the latency of private-preserving inference by converting an all-ReLU neural network to a various-precision functions in a channel-wise manner. More specifically, the planner generates replacement ratios $\alpha \in (0,1)$ and replacement options $\beta \in \{0, 1,2,3\}$ for each layer in the neural network to obtain a channel-wise activation function from four various-precision replacement options. The planner continues to optimize $\alpha$ and $\beta$ to reduce ReLU numbers as much as possible under a given accuracy threshold.

Figure 3:
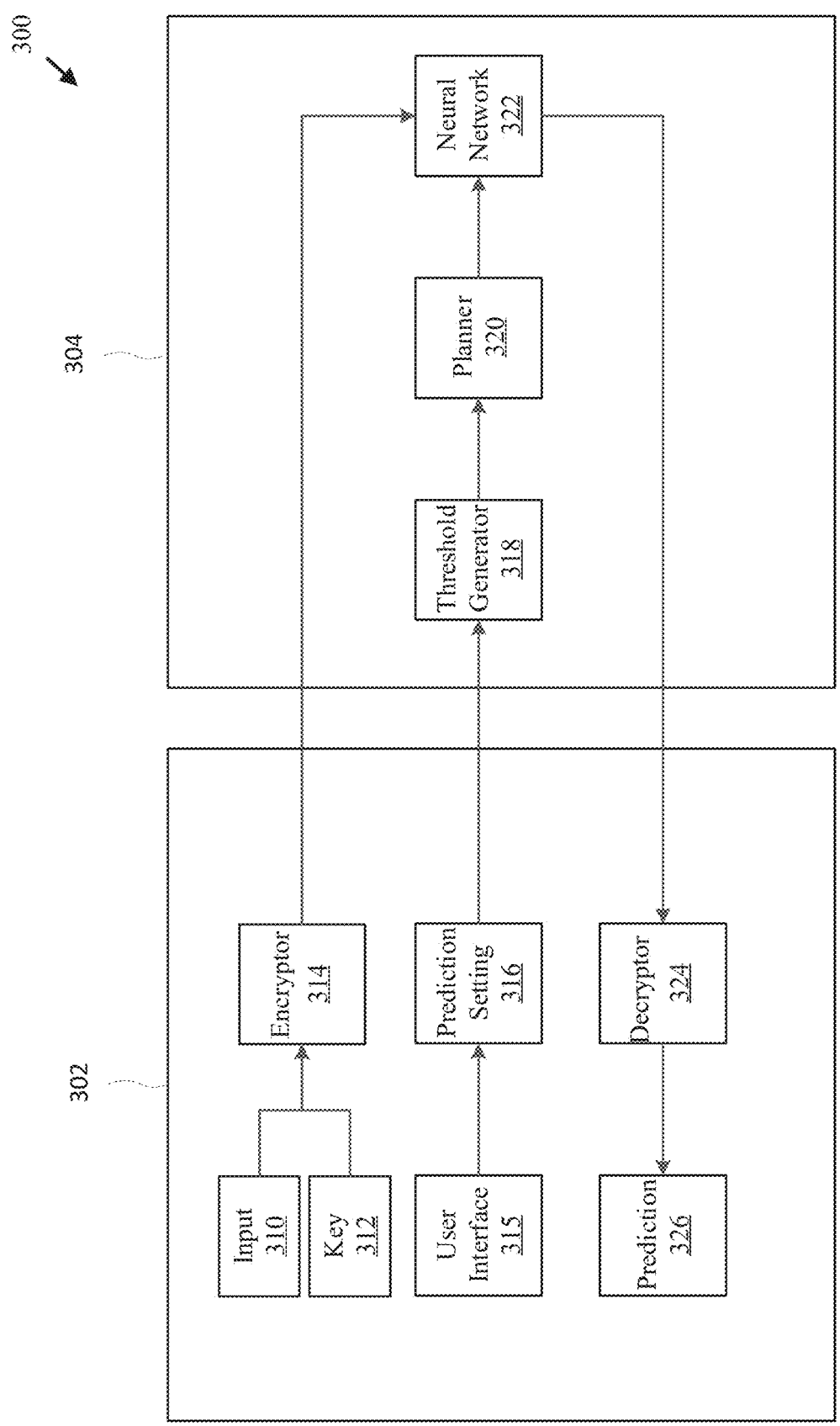
FIG. 3 is a diagram of a system for performing inference according to an embodiment.

FIG. 3 is a diagram of a system for performing inference according to an embodiment. The system 300 includes a client device 302 and a server device 304. The client device 302 (e.g., a user device) may include an encryptor 314, a user interface 315 and a decryptor 324. The server device 304 (e.g., a server device) may include a threshold generator 318, a planner 320 and a neural network 322.

The encryptor 314 may receive a prediction input 310 (e.g., an image, an audio recording, a video, etc.) as well as a public key 312 to encrypt the prediction input 310. The client device 302 may send the encrypted prediction input to the neural network 322 of the server device 304. Further, the client device 302 may receive a prediction setting 316 from a user of the client device 302 via the user interface 315. The client device 302 may send the prediction setting 316 to the threshold generator 318 of the server device.

The threshold generator 318 may generate an accuracy threshold to limit modification of the neural network 322 based on the received prediction setting. The threshold generator 318 may send the generated accuracy threshold to the planner 320. The planner 320 may modify the neural network 322 via activation channel replacement (e.g., channel-wise activation replacement, various-precision replacement, etc.), based on the generated accuracy threshold (i.e., based on the prediction setting). The server device 304 may generate a prediction 326 as well as a confidence score based on the encrypted prediction input using the modified neural network 322. The server device 304 may output the generated prediction 326 as well as the confidence score to a decryptor 324 of the client device 302. The decryptor 324 may decrypt the encrypted prediction with a private key and present (e.g., via a display (not shown)) the prediction 326 to a user of the client device 302. The user of the client device 302 may via the user interface 315 provide feedback regarding the accuracy and/or speed of the prediction 326, and then provide that feedback to the server device 304 for further training of the planner 320.

Figure 4A:
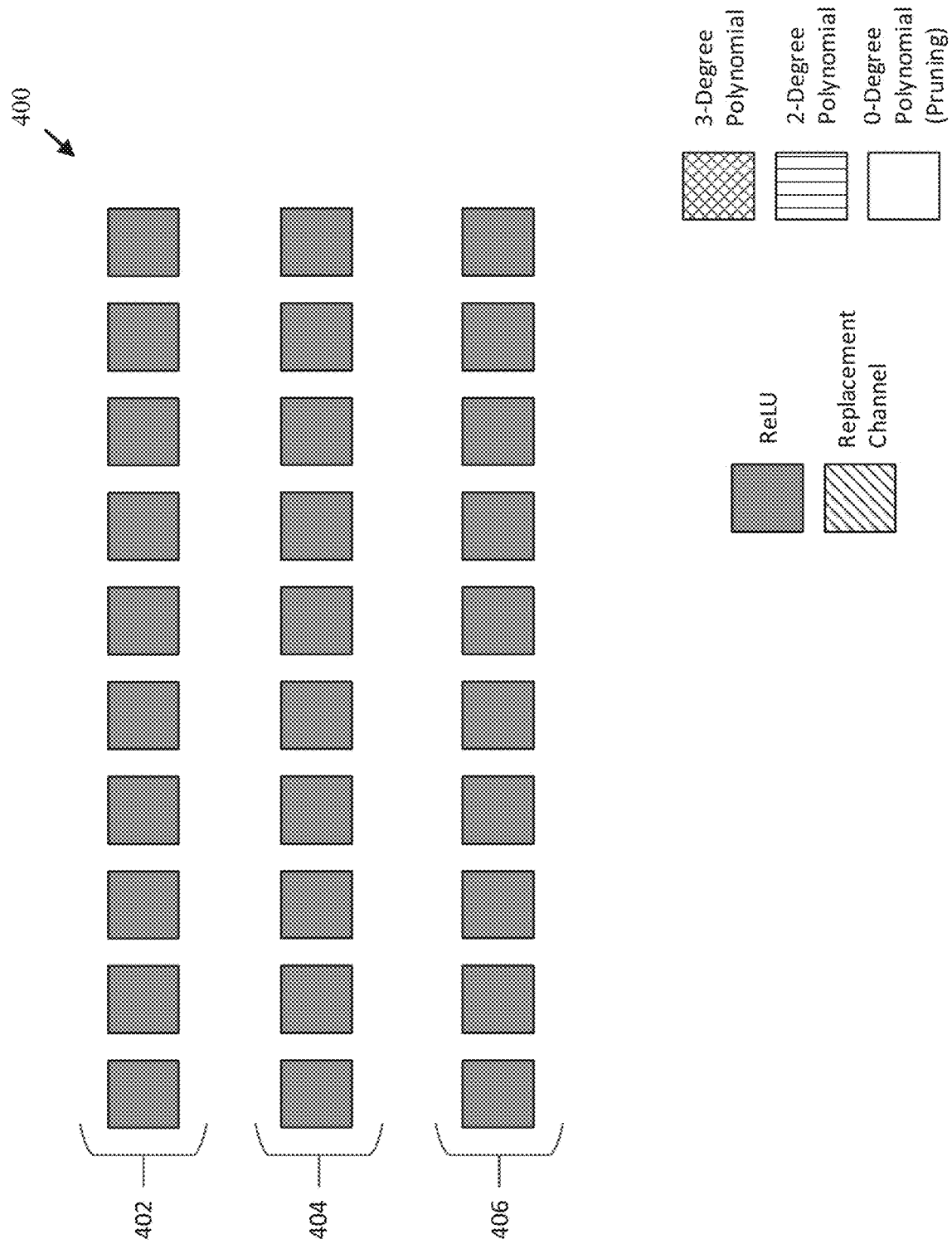
FIGS. 4A, 4B and 4C are diagrams illustrating channel replacement in a neural network according to an embodiment.
Figure 4B:
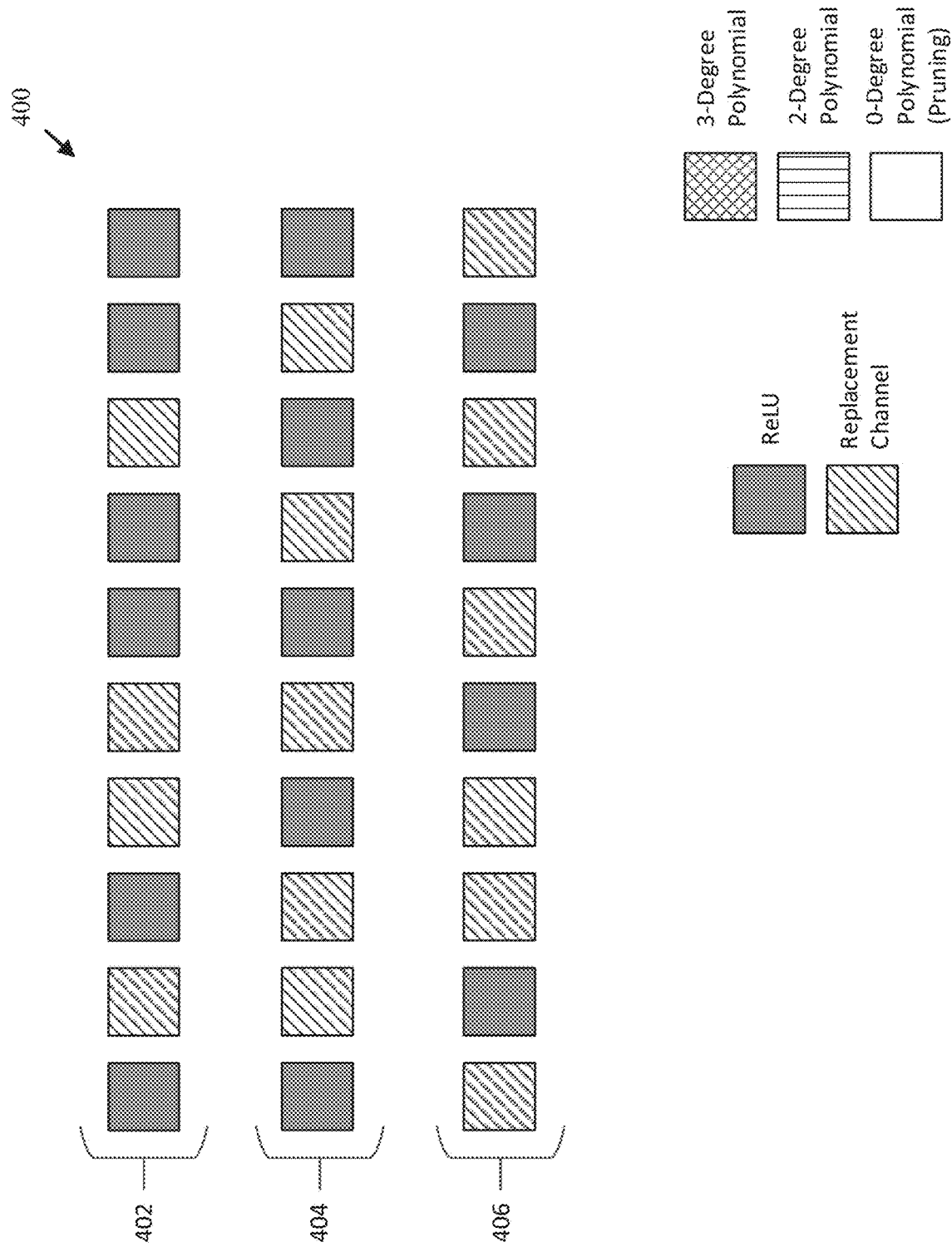
Figure 4C:
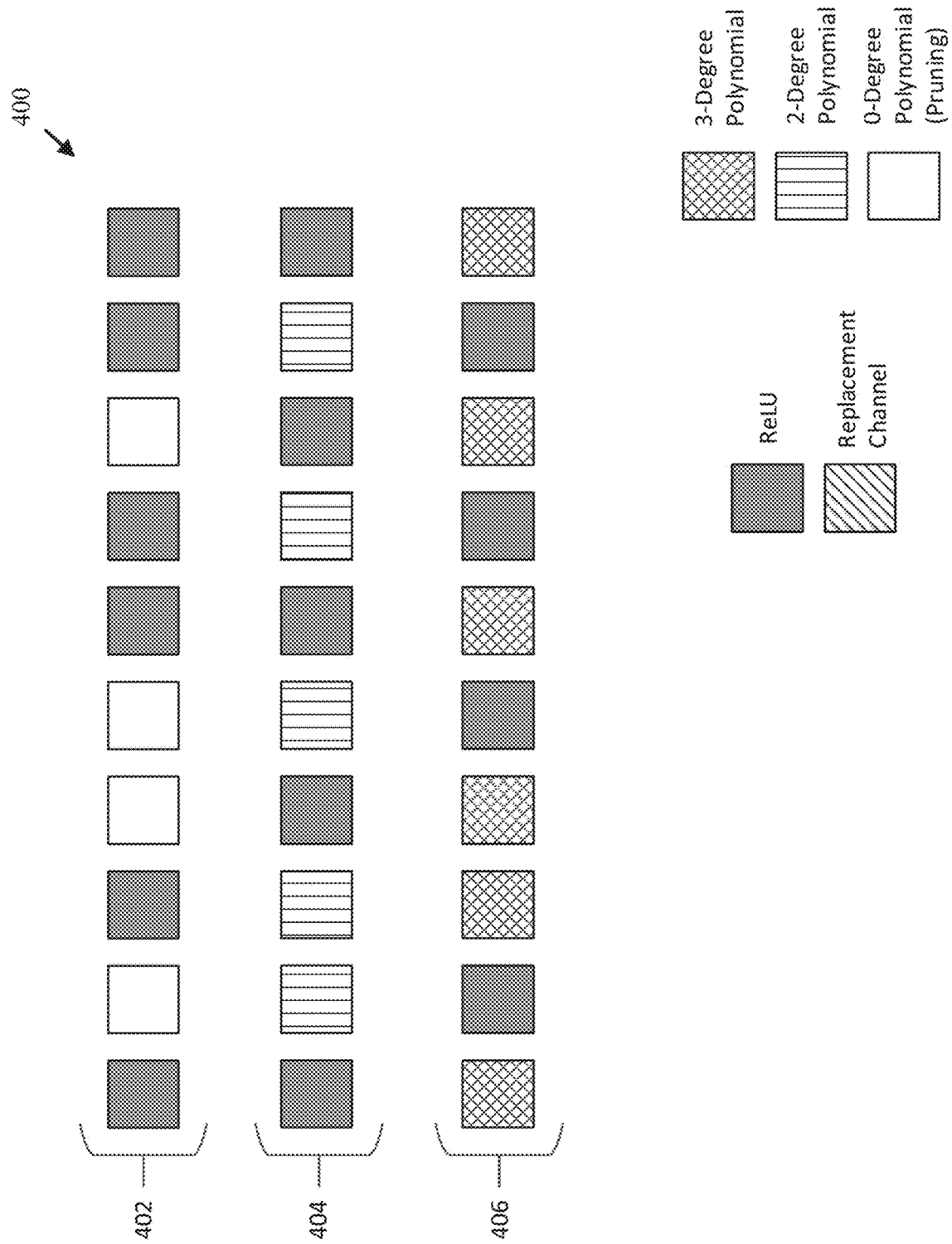

FIGS. 4A-4C are diagrams illustrating channel replacement in a neural network according to an embodiment. Referring to FIG. 4A, a neural network 400 may include all ReLU activation channels (or other non-linear activation channels). Three layers 402, 404 and 406 of the neural network 400 are depicted, although the neural network 400 may include additional layers.

Referring to FIG. 4B, the system (e.g., via the planner) performs channel-wise activation replacement on the neural network 400. The system may generate a replacement ratio $\alpha$ based on, for example, the prediction setting, to replace ReLU channels with replacement channels that have approximated function which utilize fewer resources of the system (i.e., cheaper approximated functions). The replacement ratio $\alpha$ may be $\alpha \in (0,1)$, indicating a percentage of channels that are to be replaced in each layer. In layer 402, the replacement ratio $\alpha=0.4$, so 40% of the ReLU channels are replaced. In layer 404, the replacement ratio $\alpha=0.5$, so 50% of the ReLU channels are replaced. In layer 406, the replacement ratio $\alpha=0.6$, so 60% of the ReLU channels are replaced.

Referring to FIG. 4C, the system performs precision replacement on the replacement channels. The system may generate replacement options $\beta$ based on, for example, the prediction setting. The replacement options $\beta$ may be $\beta \in \{0, 1,2,3\}$ for each layer, indicating the polynomial degree of the replacement channel. The replacement option of $\beta=3$ may refer to a degree-3 polynomial, such as $y=ax^3+bx^2+cx+d$. The replacement option of $\beta=2$ may refer to a degree-2 polynomial, such as $y=ex^2+fx+g$. The replacement option of $\beta=0$ may refer to pruning, such that $y=0$. The replacement option of $\beta=1$ may refer to the original ReLU channel. Layer 402 has a replacement option of $\beta=0$, such that the replacement channels are modified as pruning channels. Layer 404 has a replacement option of $\beta=2$, such that the replacement channels are modified as degree-2 polynomial channels. Layer 406 has a replacement option of $\beta=3$, such that the replacement channels are modified as degree-3 polynomial channels.

Here, polynomial coefficients a, b, c, d, e, f, g are trainable parameters to better approximate ReLU $y=\max(0,x)$. For example, when $e=0.09$, $f=0.50$, $g=0.47$ degree-2 polynomial $y=ex^2+fx+g$ is near ReLU. The system continues to optimize $\alpha$ and $\beta$ to reduce the number of ReLU channels as much as possible under a given accuracy threshold.

The planner of the system may be modified by way of a learning algorithm as is described below. The learning algorithm is designed by using a PBT tool. Specifically, given a pre-trained model, workers (each worker can be a computing thread or node) are created, and each worker shares the same pre-trained weights and has unique hyper-parameters. Multiple workers are then independently trained for several iterations and evaluated by the user-specified score function, as in Equation (1).

$$\text{score} = \text{accuracy} \times \left(1 + \frac{\text{cost(replaced activations)}}{\text{cost(\#total activations)}}\right) \quad (1)$$

In the exploitation, workers with better scores will keep their parameters and copy their weights and hyper-parameters to the other workers. Workers with worse scores will perform exploration to randomly scale their hyper-parameters. The training, scoring, exploitation and exploration repeats until the score function is convergent. The PBT function, which is based on hyper-parameters, dataset D, weights W, score S, may be used to optimize both hyper-parameters and weights W in training given dataset D and optimized score S.

Since each layer t has a $\alpha_t$ and $\beta_t$, the PBT cannot search $\alpha_t$ and $\beta_t$ in a layer-wise manner due to the large size of the search space. Thus, the planner disclosed herein may utilize a BTPBT to search $\alpha$ and $\beta$ in a layer-wise manner.

Figure 5:
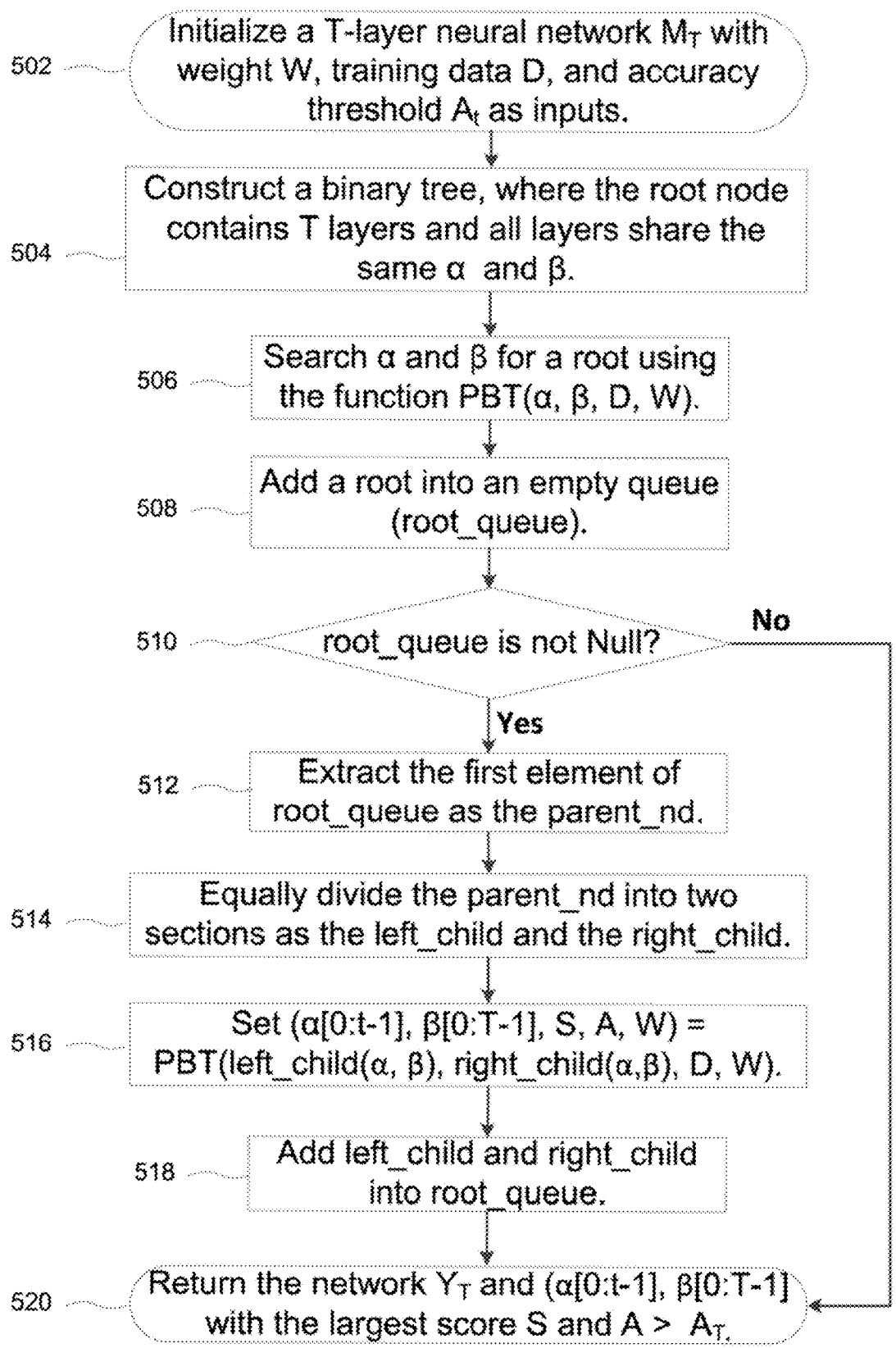
FIG. 5 is a flowchart of a method for planner learning according to an embodiment.

FIG. 5 is a flowchart of a method for planner learning according to an embodiment. In operation 502, the system initializes a T-layer neural network $M_T$, with weight W, training data D, and accuracy threshold $A_t$ as inputs. In operation 504, the system constructs a binary tree, where the root node contains T layers and all layers share the same $\alpha$ and $\beta$. In operation 506, the system searches $\alpha$ and $\beta$ for a root using the function PBT(α, β, D, W). In operation 508, the system adds a root into an empty queue (root_queue). In operations 504-508, the system is searching the activation replacement ratio α and the activation replacement option β for the whole network using the PBT tool.

In operation 510, the system determines whether the root_queue is not Null. If the result of operation 510 is yes, then, in operation 512, the system extracts the first element of root_queue as the parent_nd. Then, in operation 514, the system equally divides the parent_nd into two sections as the left_child and the right_child. In operation 516, the system sets (α[0:t−1], β[0:T−1], S, A, W)=PBT(left_child(α, β), right_child(α, β), D, W). In operation 518, the system adds left_child and right_child into root_queue. In operation 520, the system returns the network $Y_T$ and (α[0:t−1], β[0:T−1] with the largest score S and A>$A_T$. If the result of operation 510 is no, the system performs operation 520. In operations 512-518, the system loosens the limitation of α and β from the whole network to each layer. The system lets each half of the rood node, left_child or right_child share the same α and β, and the searches the left_child α and the right child α. The system then puts each child into the root_queue as a future root node, and repeatedly searches until the root_queue is empty.

Instead of using PBT to search all α[0:T−1] and β[0:T−1] directly, the planner starts from an easier task that limits all α[0:T−1] sharing the same value (e.g., α) and all β[0:T−1] sharing the same value (e.g., β). Then, the root with all T layers is equally divided into two child nodes, so that the left child has the first-half layers of the root and the right child has the remaining layers. The system then performs PBT on both left and right child nodes, and limits all layers in each child to share the same α and β. Here, the total replaced activation channels of two child node should be larger than the replaced channels of the parent node. The child nodes will become new root nodes and PBT will be performed repeatedly on the sibling nodes until the root queue is null.

FIG. 6 is a diagram of a PBT function according to an embodiment. FIG. 6 shows a running example for a T-layer network (T=4). PBT directly performs a joint search on α[0:3] and β[0:3]. The enormous search space and random initialization of α[0:3] and β[0:3] make PBT difficult to learn useful information in training. Therefore, directly using PBT suffers from slow learning speed and inadequate searching results.

FIG. 7 is a diagram of a BTPBT function according to an embodiment. The system uses BTPBT to first search one single $α_0$ for all layers and then search more α iteratively in a binary tree order. The root node of the binary tree is constructed by assigning a single $α_0$ to all the 4 layers in the neural network. One PBT is performed to search the $α_0$, given the dataset D and initialized weights W. The returning result including $α_0$, score S, accuracy A and trained weights S is called candidate[0]. After that, all layers in the root are equally divided into two parts: left child and right child. The left child contains the first two layers which shares the same $α_1$, and the right child includes the last two layers which shares the same $α_2$. Then, a single PBT is used to search $α_1$ and $α_2$ with the score S, accuracy A and trained weights W. The returning, intermediate results are called candidate. The search of left child node is more important since the former layers in the neural network contain more neuron activations than the latter layers. This BTPBT searching process is repeated until each node has only one single layer. The layer number of binary tree is equal to $\log_2 T+1$, where T is the layer number of neural network. In this way, the intermediate results about α, β and weights W can be used for the final results or the candidates of the further search. For example, the intermediate result with the largest score S can be considered as the best candidate (BC) for the warm-starting initialization for the joint search of α[0:3]. The BTPBT may reduce the training time and improve the secure inference performance.

In the learning algorithm, the important factors of every activation channel in each layer t may be calculated by their L1 normalization of each channel. Each layer t has a replacement ratio $α_t$ which decides how many ratios of channels in the layer t should be replaced. Then, the $α_t$ ratio of unimportant channels may be replaced. For example, the layer t has 100 activation channels, and each channel has its weights. With the disclosed channel-wise activation replacement, the system may calculate each channel's important factor by the L1 normalization of its weights. With $α_t$=0.6, then 60% ReLU channels with smaller important factors are replaced with cheaper functions. Then, the system only needs to perform 40 GC-based ReLU operations instead of 100 GC-based ReLU operations.

In the learning algorithm, the system uses hyper-parameter $β_t \in \{0, 2, 3\}$ as the polynomial degree of various-precision replacement functions. These three options are utilized as larger degree (>3) polynomial approximation is hardly convergent in training because of the uncontrollable gradient exploding, and smaller degree (<2) polynomial approximation shows worse performance. However, the proper insertions of degree-0 pruning may help on gradient exploding in some layers. For example, The layer t has 100 activation channels and $α_t$=0.6, $β_t$=0. Then 60 ReLU channels are replaced with pruning. If $β_t$=2, then 60 ReLU channels are replaced with degree-2 polynomial y=e$x^2$+fx+g. Alternative polynomials may be utilized as will be understood by one of skill in the art from the disclosure herein.

Figure 8:
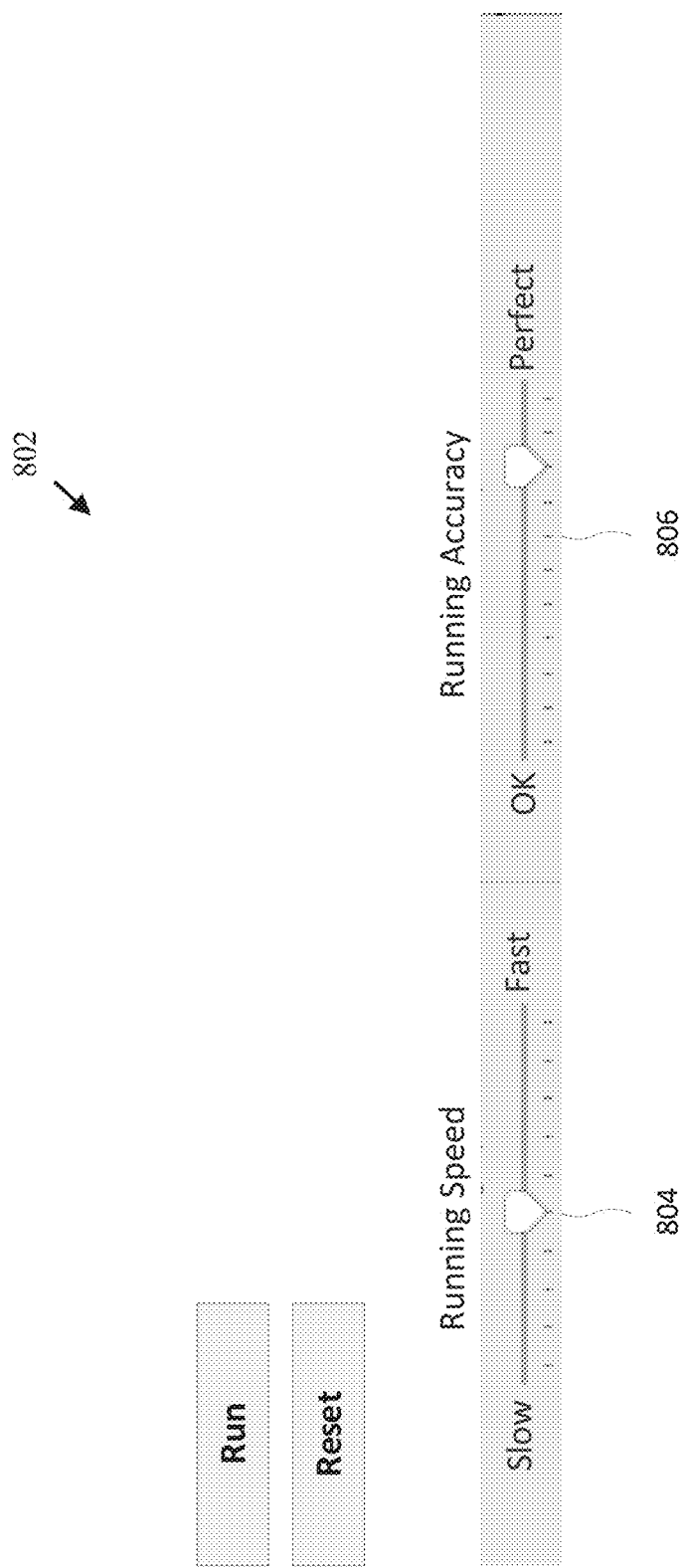
FIG. 8 is a diagram of a user interface, according to an embodiment.

FIG. 8 is a diagram of a user interface, according to an embodiment. The user interface 802 includes a first slider 804 for setting a speed for generating a prediction based on a prediction input, and a second slider 806 for setting an accuracy of a generated prediction based on a prediction input. Although sliders 804 and 806 are depicted, other interfaces may be implemented, such as dialog boxes, text entry, drop down menus, etc., as will be understood by one of skill in the art from the disclosure herein. With the user interface 802, a user can control the speed and accuracy for the server device to generate a prediction based on a prediction input.

Figure 9:
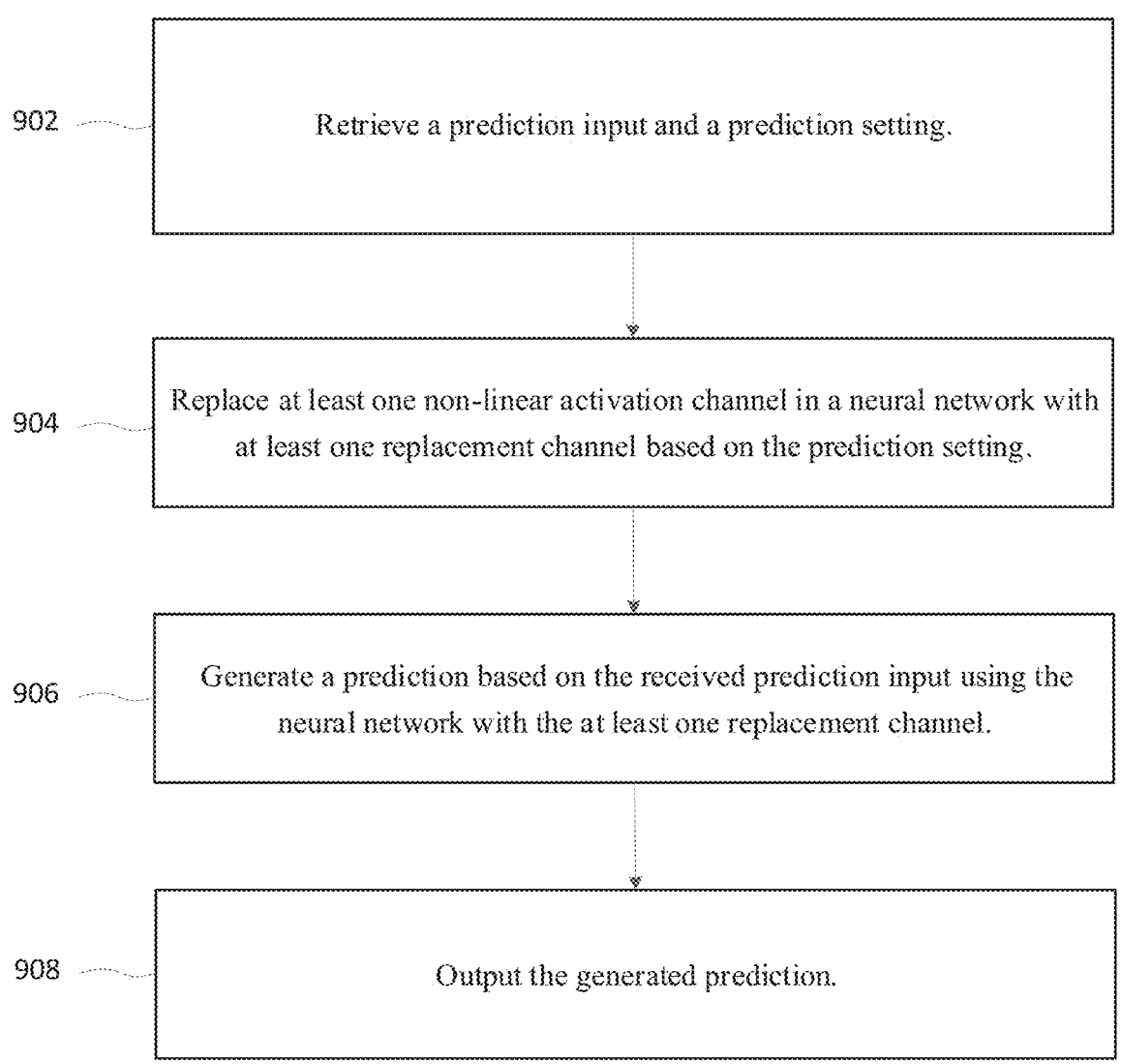
FIG. 9 is a flowchart for a method of a server device according to an embodiment.

FIG. 9 is a flowchart for a method of a server device according to an embodiment. In operation 902, the server device retrieves a prediction input and a prediction setting. In operation 904, the server device replaces at least one non-linear activation channel in a neural network with at least one replacement channel based on the received prediction setting. In operation 906, the server device generates a prediction based on the received prediction input using the neural network with the at least one replacement channel. In operation 908, the server device outputs the generated prediction.

Figure 10:
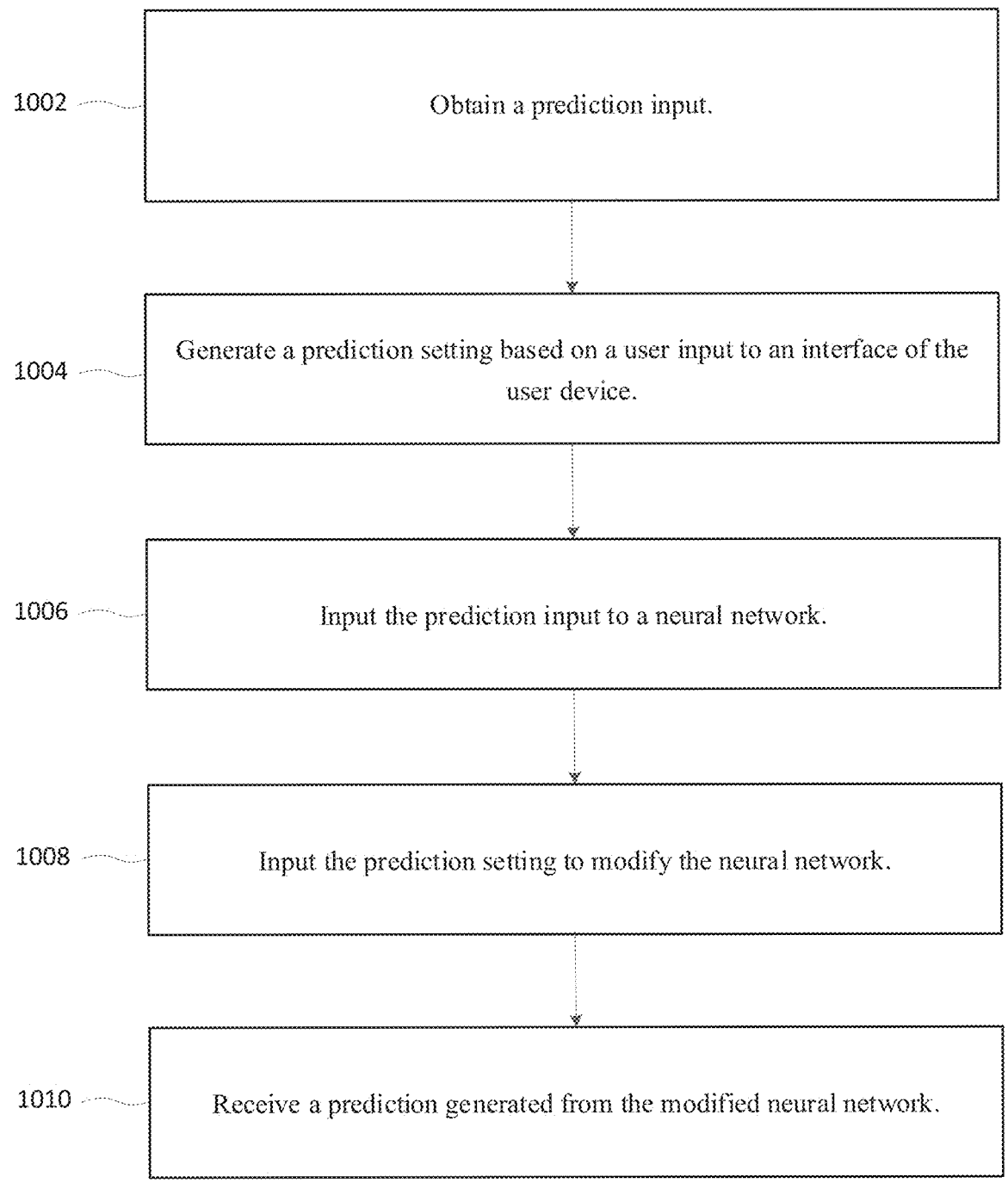
FIG. 10 is a flowchart for a method of a client device according to an embodiment.

FIG. 10 is a flowchart for a method of a client device according to an embodiment. In operation 1002, the client device obtains a prediction input. In operation 1004, the client device generates a prediction setting based on a user input to an interface of the client device. In operation 1006, the client device inputs the prediction input to a neural network. In operation 1008, the client device inputs the prediction setting to modify the neural network. In operation 1010, the client device receives a prediction generated from the modified neural network. The neural network is modified by replacing at least one non-linear activation channel in the neural network with at least one replacement channel based on the prediction setting.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

What is claimed is:

1. A method of a server device, the method comprising:
    receiving a prediction input and a prediction setting comprising an accuracy threshold;
    providing a neural network operating on the server device and comprising a plurality of channels, the neural network being configured to generate a prediction based on the received prediction input;
    based on the received prediction setting, selecting at least one non-linear activation channel among the plurality of channels that uses a non-linear activation and has a contribution to prediction accuracy of the neural network below the accuracy threshold;
    replacing the at least one non-linear activation channel with at least one replacement channel having at least one approximated linear polynomial that utilizes fewer resources of the server device than the non-linear activation;
    generating a prediction based on the received prediction input using the neural network with the at least one replacement channel; and
    outputting the generated prediction.

2. The method of claim 1, wherein the prediction setting comprises a prediction generation speed.

3. The method of claim 1, wherein the prediction setting comprises a prediction generation accuracy.

4. The method of claim 1, wherein the selecting the at least one non-linear activation channel comprises determining a replacement ratio based on the prediction setting.

5. The method of claim 4, wherein the selecting the at least one non-linear activation channel further comprises selecting a percentage of non-linear activation channels in a layer of the neural network based on the determined replacement ratio.

6. The method of claim 5, wherein the replacing the at least one non-linear activation channel further comprises determining a replacement option based on the prediction setting.

7. The method of claim 6, wherein the replacing the at least one non-linear activation channel further comprises replacing the percentage of non-linear activation channels in the layer of the neural network with a polynomial approximation function with a degree that is determined based on the replacement option.

8. The method of claim 1, wherein the prediction setting is generated based on a user input to an interface of a client device.

9. The method of claim 1, wherein the at least one non-linear activation channel comprises any one or any combination of a rectified linear unit (ReLU) activation layer, a sigmoid function activation layer, a tangent function activation layer, a softmax function activation layer, and an exponential linear unit (ELU) layer.

10. A method of a client device, the method comprising:
    obtaining a prediction input;
    generating a prediction setting comprising an accuracy threshold, based on a user input to an interface of the client device;
    inputting the prediction input to a neural network comprising a plurality of channels, the neural network being configured to generate a prediction based on the prediction input;
    inputting the prediction setting to modify the neural network; and
    receiving a prediction generated from the modified neural network,
    wherein the neural network is modified by:
        based on the prediction setting, selecting at least one non-linear activation channel among the plurality of channels that uses a non-linear activation and has contribution to prediction accuracy of the neural network below the accuracy threshold; and
        replacing the at least one non-linear activation channel with at least one replacement channel, and
    wherein the at least one replacement channel has at least one approximated linear polynomial that utilizes fewer resources than the non-linear activation.

11. The method of claim 10, wherein the prediction setting comprises a prediction generation speed.

12. The method of claim 10, wherein the prediction setting comprises a prediction generation accuracy.

13. The method of claim 10, wherein the at least one non-linear activation channel is selected by determining a replacement ratio based on the prediction setting and selecting a percentage of non-linear activation channels in a layer of the neural network based on the determined replacement ratio.

14. The method of claim 13, wherein the at least one non-linear activation channel is replaced by determining a replacement option based on the prediction setting and replacing the percentage of non-linear activation channels in the layer of the neural network with a polynomial approximation function with a degree that is determined based on the replacement option.

15. The method of claim 10, wherein the at least one non-linear activation channel comprises any one or any combination of a rectified linear unit (ReLU) activation layer, a sigmoid function activation layer, a tangent function activation layer, a softmax function activation layer, and an exponential linear unit (ELU) layer.

16. A server device, comprising:
a planner;
a neural network comprising a plurality of channels, the neural network being configured to generate a prediction;
at least one processor; and
memory that stores instructions that, when executed, cause the at least one processor to:
receive a prediction input and a prediction setting comprising an accuracy threshold;
select, with the planner, at least one non-linear activation channel among the plurality of channels that uses a non-linear activation and has a contribution to prediction accuracy of the neural network below the accuracy threshold, based on the received prediction setting;
replace, with the planner, the at least one non-linear activation channel in with at least one replacement channel having at least one approximated linear polynomial that utilizes fewer resources of the server device than the non-linear activation;
generate a prediction based on the received prediction input using the neural network with the at least one replacement channel; and
output the generated prediction.

17. The server device of claim 16, wherein the prediction setting comprises a prediction generation speed.

18. The server device of claim 16, wherein the prediction setting comprises a prediction generation accuracy.

19. The server device of claim 16, wherein the at least one non-linear activation channel is selected by determining a replacement ratio based on the prediction setting and selecting a percentage of non-linear activation channels in a layer of the neural network based on the determined replacement ratio.

20. The server device of claim 19, wherein the at least one non-linear activation channel is replaced by determining a replacement option based on the prediction setting and replacing the percentage of non-linear activation channels in the layer of the neural network with a polynomial approximation function with a degree that is determined based on the replacement option.

* * * * *